Dec. 28, 1937.　　　F. E. PAVELKA　　　2,103,954
AMUSEMENT APPARATUS
Filed April 22, 1935　　　3 Sheets-Sheet 1
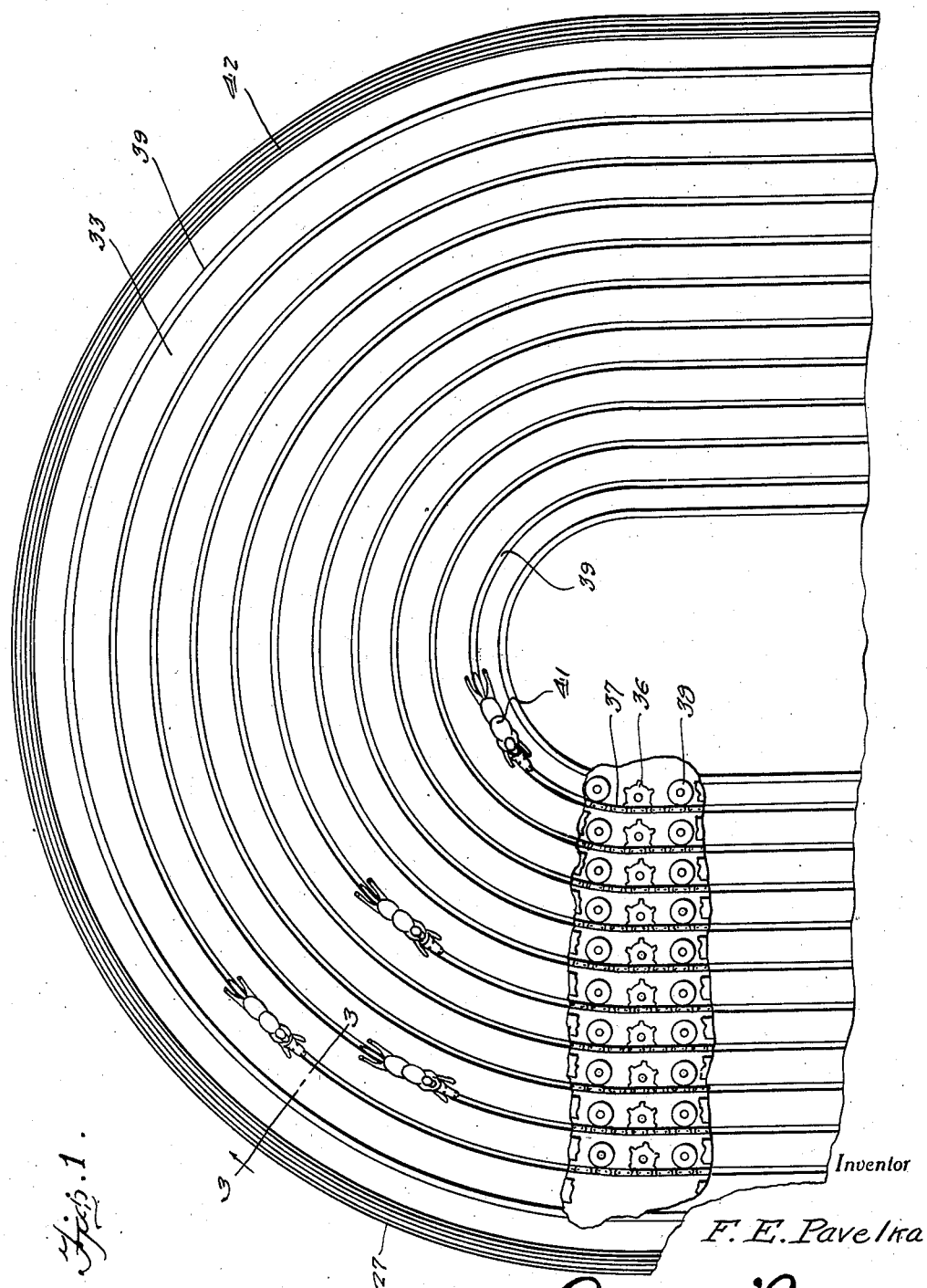

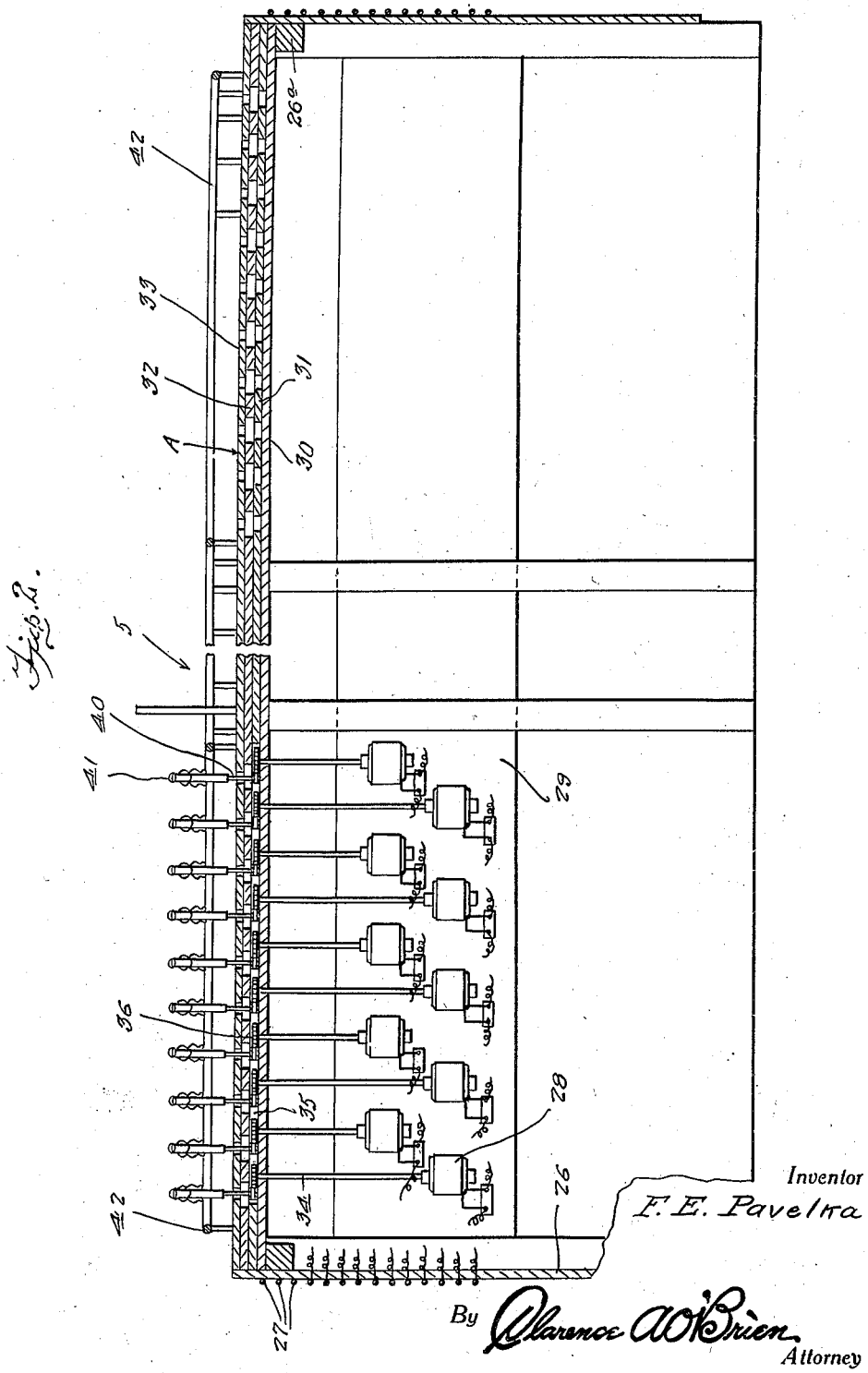

Dec. 28, 1937.   F. E. PAVELKA   2,103,954
AMUSEMENT APPARATUS
Filed April 22, 1935   3 Sheets-Sheet 3
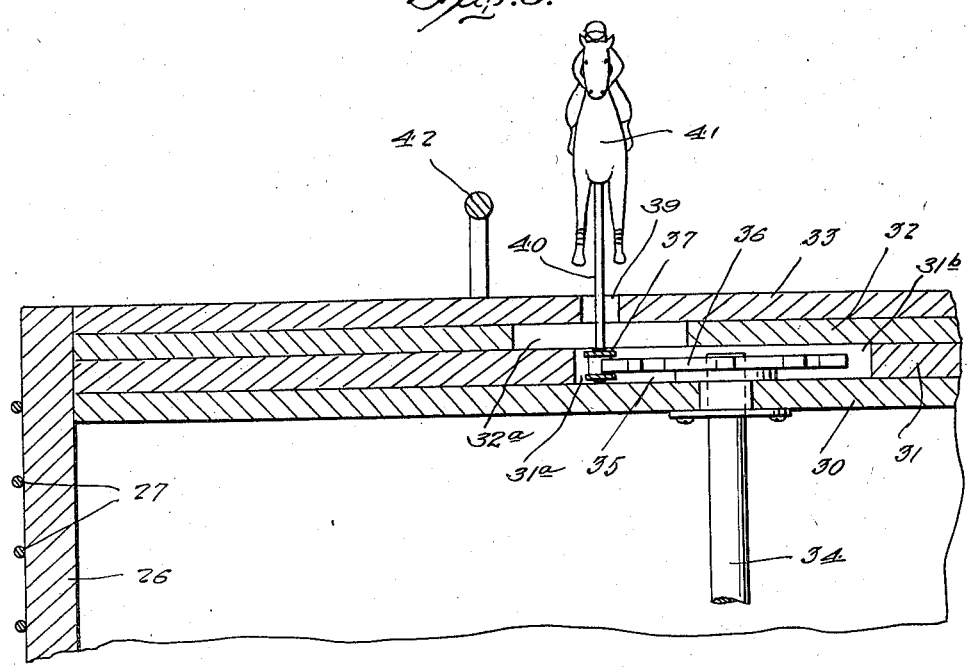
Inventor
F. E. Pavelka
By Clarence A. O'Brien
Attorney Patented Dec. 28, 1937

2,103,954

UNITED STATES PATENT OFFICE 2,103,954

AMUSEMENT APPARATUS

Frank E. Pavelka, San Antonio, Tex.

Application April 22, 1935, Serial No. 17,750

2 Claims. (Cl. 273—86)

The present invention relates to new and useful improvements in trackway apparatus for race horse simulating games.

The principal object of the present invention is to provide an amusement apparatus of the character stated wherein the trackway is constructed of multiply construction with the ply serving as guide, housing, etc.; for the figure post, gears and other elements of the game.

Another important object of the invention is to provide a miniature racetrack construction which can be conveniently built up in assembling the various parts.

Still another important object of the invention is to provide a miniature racetrack course which can be conveniently taken apart for the purpose of repair or replacement of parts.

Other important objects and advantages of the invention will become apparent to the reader of the following specification.

In the drawings:—

Figure 1 is a fragmentary top plan view of the trackway with a portion broken away to disclose the gears and rollers.

Figure 2 is a vertical transverse sectional view of the trackway.

Figure 3 is an enlarged fragmentary vertical sectional view.

Referring to the drawings wherein like numerals designate like parts, it can be seen that the trackway consists of a continuous vertical wall 26 which has a cleat 26a extending around the inside thereof just below the top edge thereof, to serve as a support for the trackway generally referred to by character reference A.

This trackway A is built up of the lowermost ply 30 upon which is disposed the second ply 31 and upon this ply 31 is the third ply 32. The top ply 33 rests upon the ply 32 and this assembly is clearly shown in Figure 3.

As is shown in Figures 2 and 3, the motor shafts 34 which extend upwardly from the motors 28 mounted on the panel 29 project upwardly through bushings in the bottom ply 30. The ply 31 besides being provided with a continuous slotway 31a for the chain 37 is provided with a pocket 31b to accommodate the sprocket wheel 36 on the upper end of the shaft 34. There is a channelway 31a for each of the chains 37 and a corresponding pocket 31b for each of the sprockets 36 of each motor and figure assembly. Thus the ply 31 takes care of the sprocket 36 and chains 37, as well as the rollers 38.

The ply 32 has for each of the motor and figure assemblies a continuous slot 32a substantially wider than the slot 31a so that by removing the ply 33 direct access can be had to the chain 37 without removing the ply 32.

The top ply 33 besides forming a top plate for the assembly A also has the slotway 39 therein and through this projects the post 40 from the chain 37 and this post carries the figure 41.

On the top ply is the fence simulating structure 42 and suitable conductor members 27 can be provided on the outside of the wall 26 for furnishing electricity to the motors 28.

Thus when the motors 28 are set in operation the sprocket wheels 36 in rotating will drive the chains 37 which will carry the post 40 and figure 41 around the trackway over their respective slots 39.

Suitable speed regulating means can be provided for the motors 28 so that the inner figures 41 will travel at a slower average speed than the outermost figure 41. However, this is not shown in the drawings and forms no part of the present invention.

While the foregoing specification sets forth the invention in specific terms, it is to be understood that numerous changes in the shape, size and materials may be resorted to without departing from the scope of the invention as claimed hereinafter.

Having described the invention what is claimed as new is:—

1. A game apparatus comprising a trackway including a plurality of superimposed plies, the uppermost ply having a plurality of slots therein, one of the intermediate plies having a plurality of slots therein underlying the slots of the uppermost ply, sprocket chains extending longitudinally in the slots of the second-mentioned ply, said second-mentioned ply having pockets therein at the edges of the slots therein, sprocket wheels in the pockets, drive means extending through the lowermost ply and operatively connected with the sprocket wheels, and figure supporting members extending upwardly from the chains and through the slots of the top ply.

2. A game apparatus comprising a trackway including a plurality of superimposed plies, the uppermost ply having a plurality of slots therein, one of the intermediate plies having a plurality of slots therein underlying the slots of the uppermost ply, sprocket chains extending longitudinally in the slots of the second-mentioned ply, said second-mentioned ply having pockets therein at the edges of the slots therein, sprocket wheels in the pockets, drive means extending through the lowermost ply and operatively connected with the sprocket wheels, and figure supporting members extending upwardly from the chains and through the slots of the top ply, one of said plies being located immediately upon the second-mentioned ply and under the top ply and having a plurality of slots therein substantially wider than the slots in the second-mentioned ply to permit ready access to the chains in the slots of the second-mentioned ply.

FRANK E. PAVELKA.